US006859691B2

(12) United States Patent
Puchkoff

(10) Patent No.: US 6,859,691 B2
(45) Date of Patent: Feb. 22, 2005

(54) DEVICE AND METHOD FOR ENABLING A MARINER TO SELECT STORM HAVENS

(76) Inventor: David Puchkoff, 131 Spring St., New York, NY (US) 10012

(*) Notice: Subject to any disclaimer, the term of this patent is extended or adjusted under 35 U.S.C. 154(b) by 0 days.

(21) Appl. No.: 10/378,746

(22) Filed: Mar. 4, 2003

(65) Prior Publication Data

US 2004/0153222 A1 Aug. 5, 2004

Related U.S. Application Data

(60) Provisional application No. 60/444,291, filed on Jan. 31, 2003.

(51) Int. Cl.[7] .......................... G06F 7/00; G06F 17/00

(52) U.S. Cl. ........................ 701/21; 701/213; 701/214; 701/225; 342/357.08

(58) Field of Search ........................ 701/21, 200, 207, 701/208, 212, 213, 214, 225, 300; 392/357.01, 357.08

(56) References Cited

U.S. PATENT DOCUMENTS 4,071,845 A * 1/1978 Gross ........................ 342/433
5,848,373 A * 12/1998 DeLorme et al. ........... 701/200
5,898,680 A * 4/1999 Johnstone et al. .......... 370/316
6,520,104 B1 * 2/2003 Svensson ................ 114/144 R
6,591,774 B2 * 7/2003 Metherell et al. ........... 114/241
6,592,412 B1 * 7/2003 Geil et al. ..................... 440/6

OTHER PUBLICATIONS

US2003/0051652 Metherell et al. Mar. 20, 2003 apparatus and method for protecting ships and harbors from attack by vessels.*

* cited by examiner

*Primary Examiner*—Gertrude A. Jeanglaude
(74) *Attorney, Agent, or Firm*—Gottlieb, Rackman & Reisman, P.C.

(57) ABSTRACT

A microprocessor controlled device and method utilizing an information database concerning harbor attributes and a collection of harbor maps and images, together with algorithms that determine which harbors are appropriate for shelter against certain weather conditions to guide a specific yacht to an appropriate harbor in various weather conditions; or other relevant harbor location issues that may concern a mariner. It integrates with GPS technology to determine the location of the vessel. The invention provides a convenient graphical interface allowing the user at each stage a dialog to reset the various parameters and a graphical, and narrative presentation of the various features of the selected harbors, filtered specifically to the weather conditions, the vessel perimeters, the harbor attributes and the needs and interests of a particular vessel and it's mariner.

20 Claims, 11 Drawing Sheets

DEVICE AND METHOD FOR ENABLING A MARINER TO SELECT STORM HAVENS

This application claims the benefit of Provisional application Ser. No. 60/444,291, filed Jan. 31, 2003.

FIELD OF THE INVENTION

This invention relates to systems for plotting vessel courses into harbors.

BACKGROUND OF THE INVENTION

With the advent of the Global Positioning System (GPS), and the availability of graphically capable, rugged, relatively low cost computers, accurate navigation information coupled with accurate navigational maps has been made available to mariners. The GPS system, as currently available allows the mariner to locate his or her position to within a few meters, to maintain records of courses sailed, to record the location of obstacles or markers, and to plot courses between points that are input by the user or stored in databases. In particular, the location of channels and buoys at harbors are available in databases that can be used in connection with GPS systems. Alternatively, using these computers a mariner could input his location coordinates as obtained through LORAN, RDF or other coordinate positioning systems and accomplish the same result without the use of the GPS system, although no other system is as consistently accurate. Aspects of this technology have been previously patented or described in the published literature.

U.S. Pat. No. 5,898,680 disclosed a system for providing electronic location-specific data to a user. It described a system for providing digital maps and other data to users at remote locations. The position of the user is determined by a GPS receiver. Based on the position of the user, appropriate maps are downloaded from a satellite broadcasting system. U.S. Pat. No. 5,848,373 disclosed a computer aided map location system. It described a way to correlate data such as GPS location data and a set of printed maps. In "The Coast Guard's Differential GPS Program", 39 J. Inst. of Navigation (No. 4) p. 345–61 is disclosed a Coast Guard project to provide differential GPS service for Harbor and Harbor Approach areas of the coastal United States, having 8–20 m navigation accuracy.

These systems, although potentially extremely useful, are not designed to aid a specific mariner in a specific sailing vessel, in a particular weather determined situation. In particular, the provision of all this information can be overwhelming when a ship is threatened with severe weather and needs to quickly chart a course and locate an appropriately safe harbor suitable for that specific situation for that particular vessel. These systems typically do not provide the information that would enable an informed decision to be made that takes into account the properties of the harbors, or marinas, close enough to be considered as a shelter, the direction of the oncoming weather and the particular characteristics of the vessel such as its height, to determine whether a particular harbor has height restrictions (bridges, etc.) docking requirements (length and width), overall size limitations (displacement for hauling onto land), and depth below waterline limitations (needed to determine whether a particular harbor is appropriate to even consider as a place of shelter).

BRIEF DESCRIPTION OF THE INVENTION

The present invention provides a microprocessor controlled device and method utilizing an information database concerning harbor attributes and a collection of harbor images, charts, and sketches, together with algorithms that determine which harbors are sheltered against certain weather conditions to help determine the decisions necessary to guide a yacht to a safe harbor during various weather conditions. It integrates the option of using GPS technology to determine the location of the vessel, or to use a manual position entry. The invention enables the mariner to locate harbors, within a user preferred defined area or range, that can provide the type of shelter and harbor facilities that are most suitable for each individual boat, during particular weather conditions. To accomplish this, each harbor record contains a harbor entry aerial photograph, a chart of the harbor, a sketch of the harbor (detailing specific features not found on the chart), narrative information, marina images and other information, and by providing tidal information for the expected time of arrival to that particular harbor, from the nearest tide station. An additional feature allows the user to save any number of singular harbor route to a particular location, so a specific path from point A to point B, with numerous views of the intermediate layover locations can be saved as a future reference for a possible safe route.

The invention provides a convenient graphical interface allowing the user at each stage to have access to a dialog to reset the various parameters and a graphical presentation of the various available choices of harbors that meet the specifically defined requirements.

DETAILED DESCRIPTION OF PREFERRED EMBODIMENTS

Figure 1:
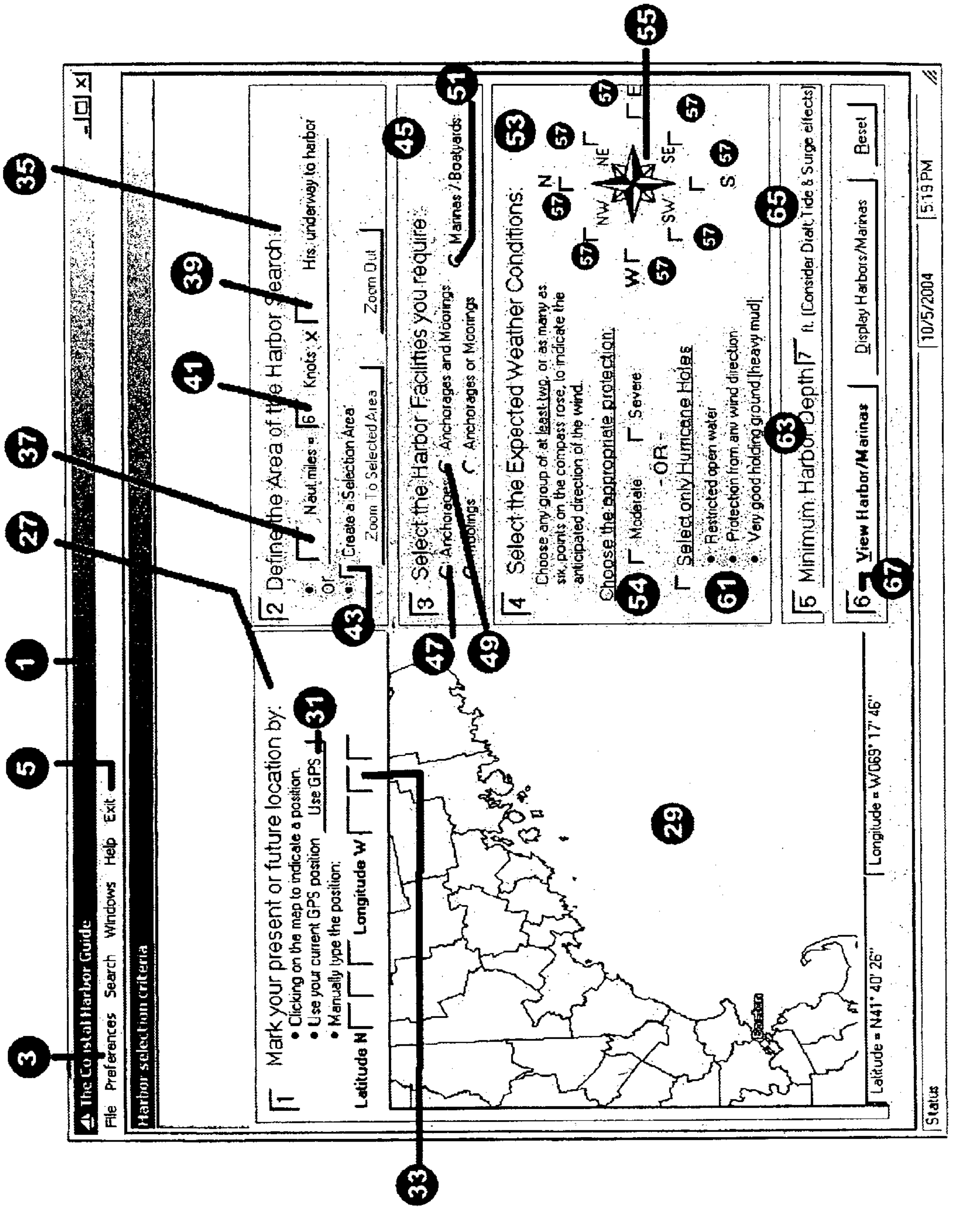
FIG. 1 is an image of a Harbor Guide regional graphical interface.

In implementing the method of the invention, a map of a large region, (for example the East Coast of the U.S.) is displayed, with a number of areas defined as localized selection regions. The mariner selects a specific region and will then view an enlarged area of the specific region chosen. The mariner may zoom in order to view a specific area in varying levels of greater detail. These zoom-ins are vector formatted so great definition can be displayed when zooming in very close.

The mariner is then prompted to locate the position, or proposed position of the boat either by using an attached GPS instrument, manually inputting the latitude and longitude, or "Clicking" on a specific location point on the map with the cursor, which displays the latitude and longitude of the mouse cursor on the map and as well in the Lat/Long text entry boxes, when a location point is "clicked". This allows the distance from the current location, or proposed location, of the vessel, to each possible harbor, to be calculated for future display.

The mariner then either enters the boat speed, (unless previously entered in the preferences section) and the hours remaining before shelter must be found, in order to create a radius distance that is used to display a circular area within which are the harbors that may be viewed; or clicks and drags, to define a rectangle area, anywhere on the map (or outside the selected location) within which are the harbors that may be viewed. This defines are area that will be searched, and will exclude all harbors found outside the defined area (those harbors found beyond the range or interest of the mariner).

The mariner then either selects the type of harbor facilities required, such as anchorage areas; moorings; slips; haul out requirements, or previously in a Preferences form, identifies the particular characteristics of his vessel and accepts them as default values. This customized information is used to filter out those harbors or Marinas that do not offer the necessary or user chosen attributes and facilities.

The mariner then either selects the direction of the anticipated wind conditions by choosing any adjacent group of compass points, as displayed on an eight point compass rose; selects either the wind intensity, or a data link to prevailing weather information, or selects a "Hurricane Hole"—a harbor protected from all wind directions. This will filter out all the harbors which do not provide shelter from the wind direction chosen or whose protection is not appropriate for the intensity of the expected wind.

The mariner then either enters the minimum harbor depth required or designates his vessel draft default setting. This will filter out all harbors which are less than the required depth.

After this final choice, the mariner may view, as location points displayed directly on the map, all the harbors that meet all the criteria that has been selected. If the displayed location points are either too many or too few, the mariner may reselect any of the choices, until satisfied with the amount of appropriate harbors available for further review, or he may "opposite click" (i.e. right click if normally left clicks open files, or vice versa) on any location on the map in order to directly view the nearest harbor or the nearest 3 harbors that suits the selected criteria.

Upon choosing to review the list of appropriate harbors meeting the defined criteria, the following is displayed: a list of harbors with "thumbnail" images of the harbor, the sketch and the harbor or marina location for the harbors nearest the vessel's noted position, along with a brief description of the harbor's characteristics. The mariner can now browse the list and then select for more detailed review, the specific harbor information (photos, charts, sketches, narrative data, tidal information and shoreside services) of each previously defined harbor location. Routes may be recorded on the system. Where a new or previously used route is recorded on the system selected harbors may be attached to the route.

The mariner can now determine and select the specific characteristics of various harbors quickly. He is then able to view quickly all the appropriate harbors that are within his range, without having to sort through all the various harbors that may or may not be suitable, because of the specific characteristics of his skills, his boat, the harbor, or the particular weather conditions that exist at that moment.

The invention will now be described in connection with the figures depicting the graphical interfaces provided and by the flow chart of steps in the implementation of the invention.

Figure 2:
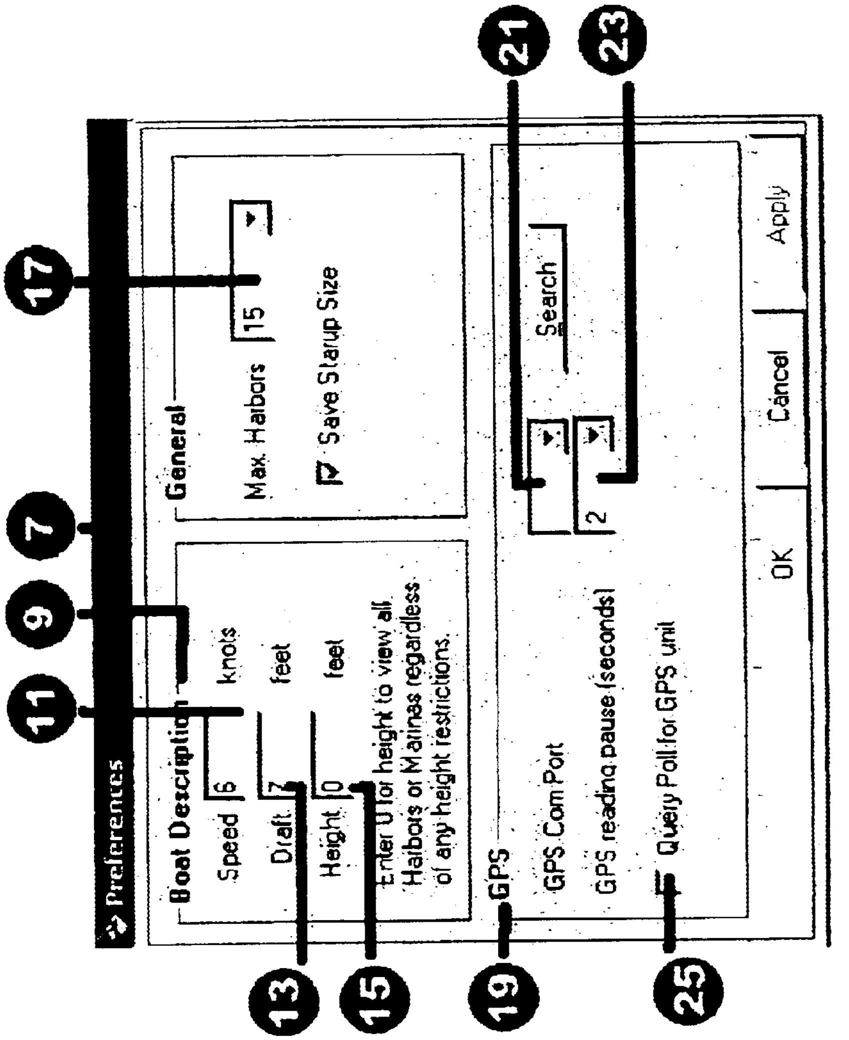
FIG. 2 is an image of a preferences dialog box.

Upon startup of the program the user is presented with a Harbor Guide graphical interface 1, FIG. 1. The Harbor Guide interface 1 contains six areas, which will be described below. Initially the user may select Preferences 3 from the Harbor Guide Menu 5. This opens the Preferences dialog box 7, FIG. 2, which displays a Boat Description area 9 for the user to input data into a speed field 11 for the typical boat speed in knots, a draft field 13 for the boat draft below waterline, and a height field 15 for the maximum height of the vessel above waterline. The Preferences dialog box 7 further provides a Max. Harbors field 17, which controls the number of harbors reported as matching selection criteria. The Preferences dialog box 7 also contains a GPS field region 19 having fields to facilitate coordination of the program with GPS (global positioning satellite) information. These fields are GPS Com Port 21, GPS reading pause in seconds 23, and Query Poll for GPS unit 25. Once the Preference dialog box 7 fields are completed, the values input govern the operation of the program. In addition the program allows and prompts for return to the Preferences dialog box when the values selected can have an effect on the program. These prompts can be ignored when default values are operative, or the defaults can be overridden if so desired.

The Harbor Guide interface 1 contains an Area 1, 27, which enables designation of the present or future location of the boat. Part of Area 1 contains a large scale map 29 of the region for which there is data on harbors or marinas. The designation of boat location can be accomplished by several methods. Using a mouse guided cursor the location can be indicated by clicking on the recognized map location. Alternatively integration with a GPS device allows the current boat location to be used by depressing a GPS location selection button 31. Still alternatively the known or assumed Latitude and longitude coordinates could be manually input into Lat/Long numerical fields 33.

The Harbor Guide interface 1 contains an Area 2, 35, which enables designation of the harbor search area, i.e. to define the possible location of harbors of interest. This area can be selected by filling fields specifying a radius from the boat location in nautical miles, either by filling in the radius field 37 or by filing in the time to harbor field 39, which causes a radius to be determined by multiplying the time by the average boat speed field value 41. Where the boat speed has not been specified in field 11, it may be directly entered in the field 41. Alternatively a selection area field 43 may be selected, which will enable a rectangular area to be selected on the map 29, without specific reference to the present location of the vessel or its speed. At any time during this selection process the view of the map 29 may be changed by zooming in or out on the map figure. For this purpose the map is in a vectored format so as to preserve image resolution.

The Harbor Guide interface 1 contains a Harbor Facilities Area 3, 45, having fields for selection of the particular facilities required by the vessel. The facilities selection fields comprise an anchorages field 47, and/or mooring fields 49, or alternatively a marinas/boatyards field 51. The selected field(s) filter the harbor information that will be provided, consistent with the maximum number of harbors selected in field 17.

The Harbor Guide interface 1 contains a Weather Conditions Area 4, 53, having a graphical interface for choosing wind conditions from which the vessel requires shelter. The primary graphical mechanism for selecting wind direction is a compass rose 55, having eight wind directions bearing 450 between directions. Clicking on at least two anticipated wind direction fields 57 indicates the anticipated direction of the wind. The more wind direction that are chosen will provide greater filtration of the data. In addition protection level fields 59 allow indication of whether protection is required from moderate or severe wind conditions. Severe conditions may, for example, be defined as above as small craft warning conditions and will select harbors that provide a higher degree of wind speed protection. Alternatively to using protection level fields 59 the user may select the hurricane holes field 61. In that event only those facilities having restricted open water, protection from any wind direction and very good holding ground (e.g. heavy mud) will be chosen.

The Harbor Guide interface 1 contains a minimum harbor depth Area 5, 63, that provides a minimum harbor as the controlling depth field 65. Initially this field contains a value taken from the draft field 13. But the user is able to input a different value into the field 65, which takes into account draft, tide and surge effects that the mariner wants to be considered. Alternatively, the program will calculate a minimum harbor depth from the boat description information from the preference values viewable on the preferences dialog box 7.

Finally, the Harbor Guide interface 1 contains a view control Area 6, 67, having a selection button for activating the view of harbor/marinas, or a symbolic position display of the harbors/marinas meeting the selection criteria input into the various fields previously described.

Figure 3:
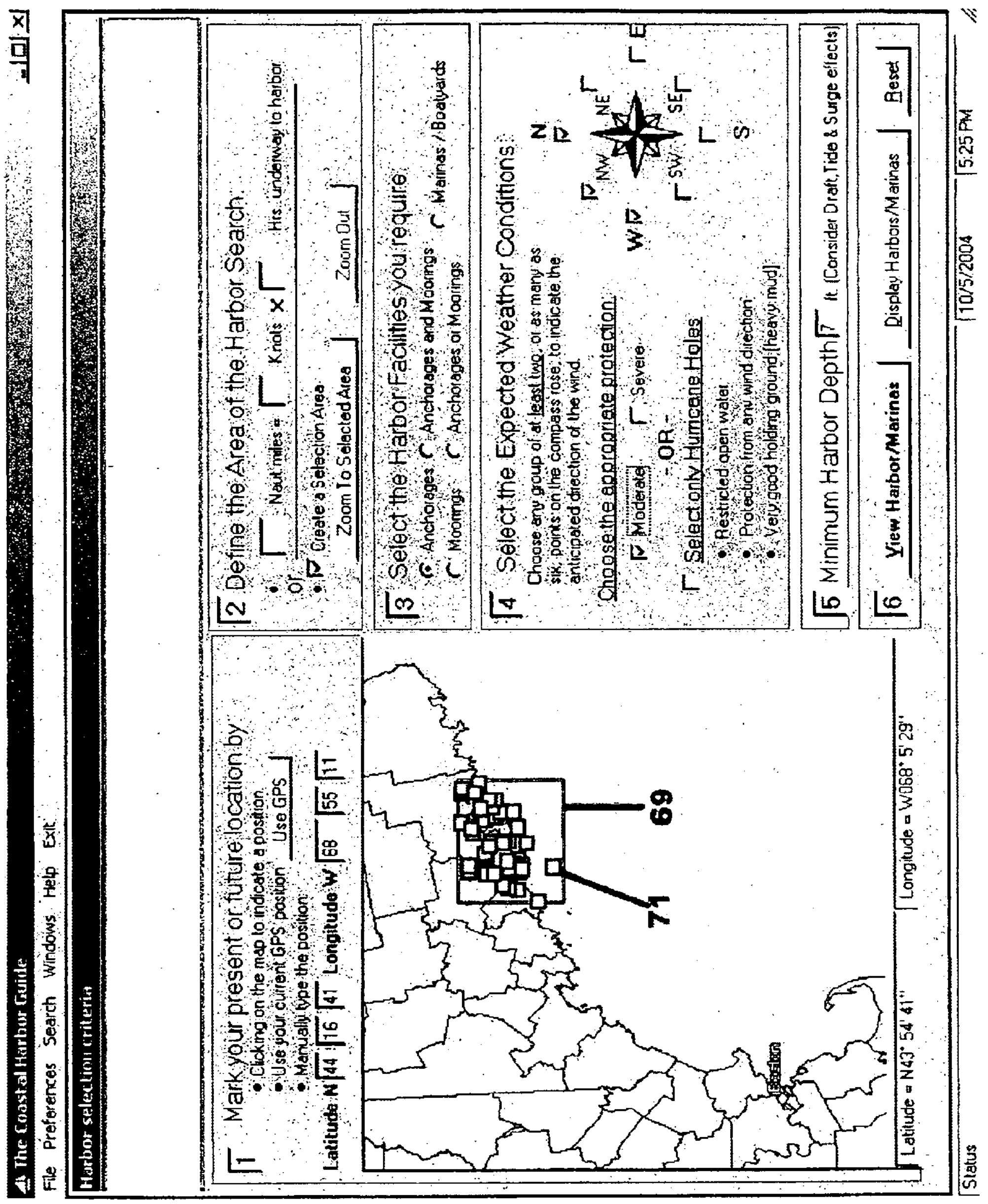
FIG. 3 is an image of a Harbor Guide graphical interface after selection of harbor criteria.
Figure 3A:
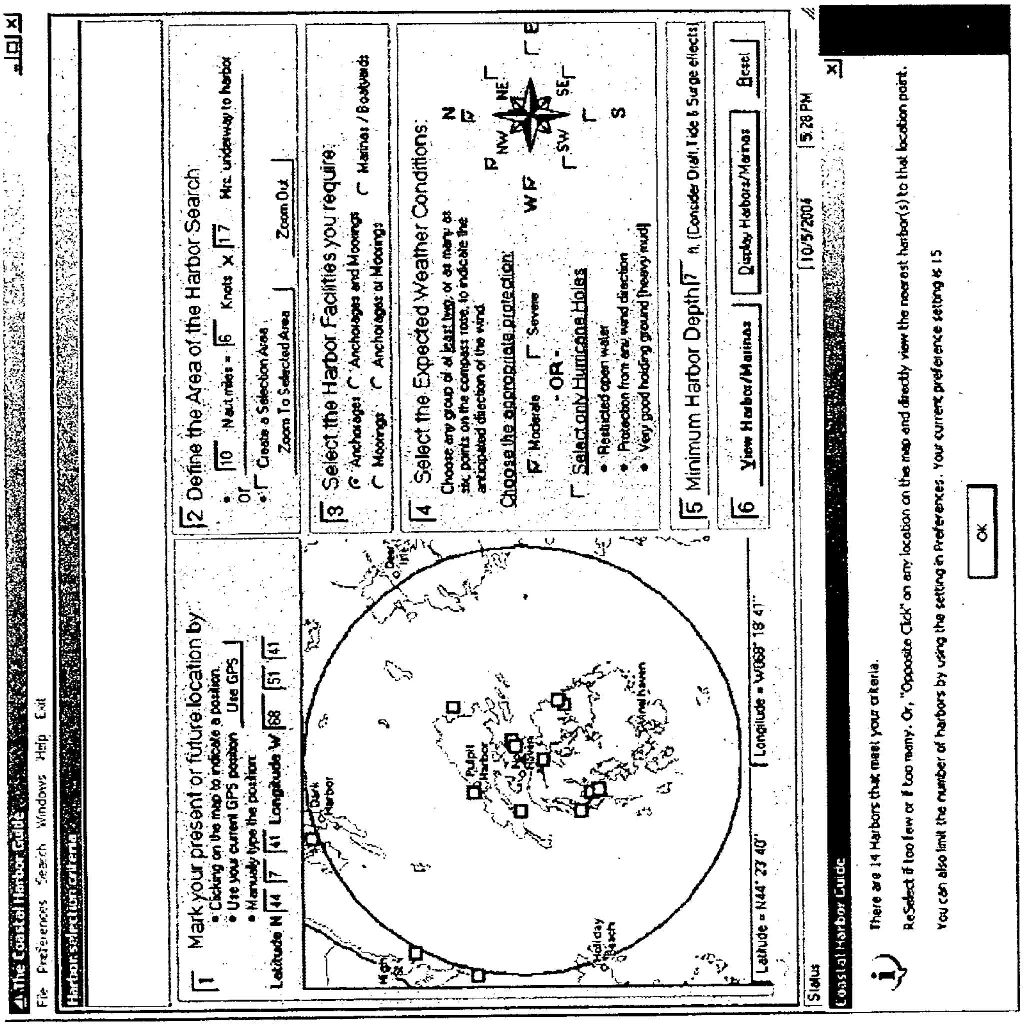
FIG. 3A is an image of the selected area and harbor criteria after a "Zoom to selected Area" is chosen.

FIG. 3 shows the result of a typical harbor search. By clicking on the map 29 the vessel position was indicated. This caused the Lat/Long fields 33 to fill with the appropriate coordinates locating the vessel. The area of the harbor search was indicated by indicting the desire to specify a selection area by clicking selection area field 43, and using a mouse to define the rectangular area 69 on map 29. The Harbor Facilities were selected by indicating anchorages in anchorages field 47, and specifying three wind directions, N, NW, and W, in wind direction fields 57, and specifying wind intensity as moderate, and a minimum harbor depth field value of 6 feet. The harbors meeting the criteria, in this case up to a maximum of 15, by virtue of the Max. Harbor field-value in field 17, are shown as small rectangles 71 on the map 29.

Figure 4:
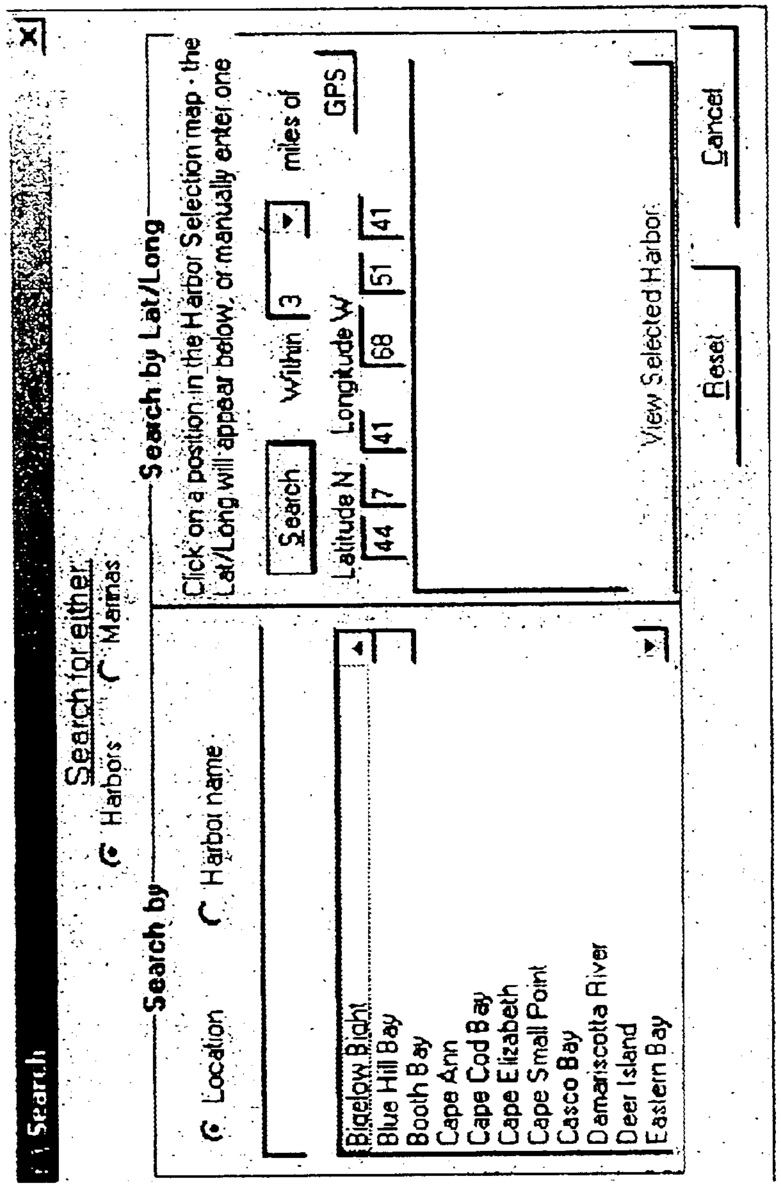
FIG. 4 is an image of a search dialog box.

FIG. 4 shows the result of searching for harbors or marinas by directly accessing the harbor/marina database by location or harbor name, or searching within a selected distance from a point identified by its Lat/Long coordinates in order to find a specific harbor or marina—without entering the criteria as selected in FIG. 3.

Figure 5:
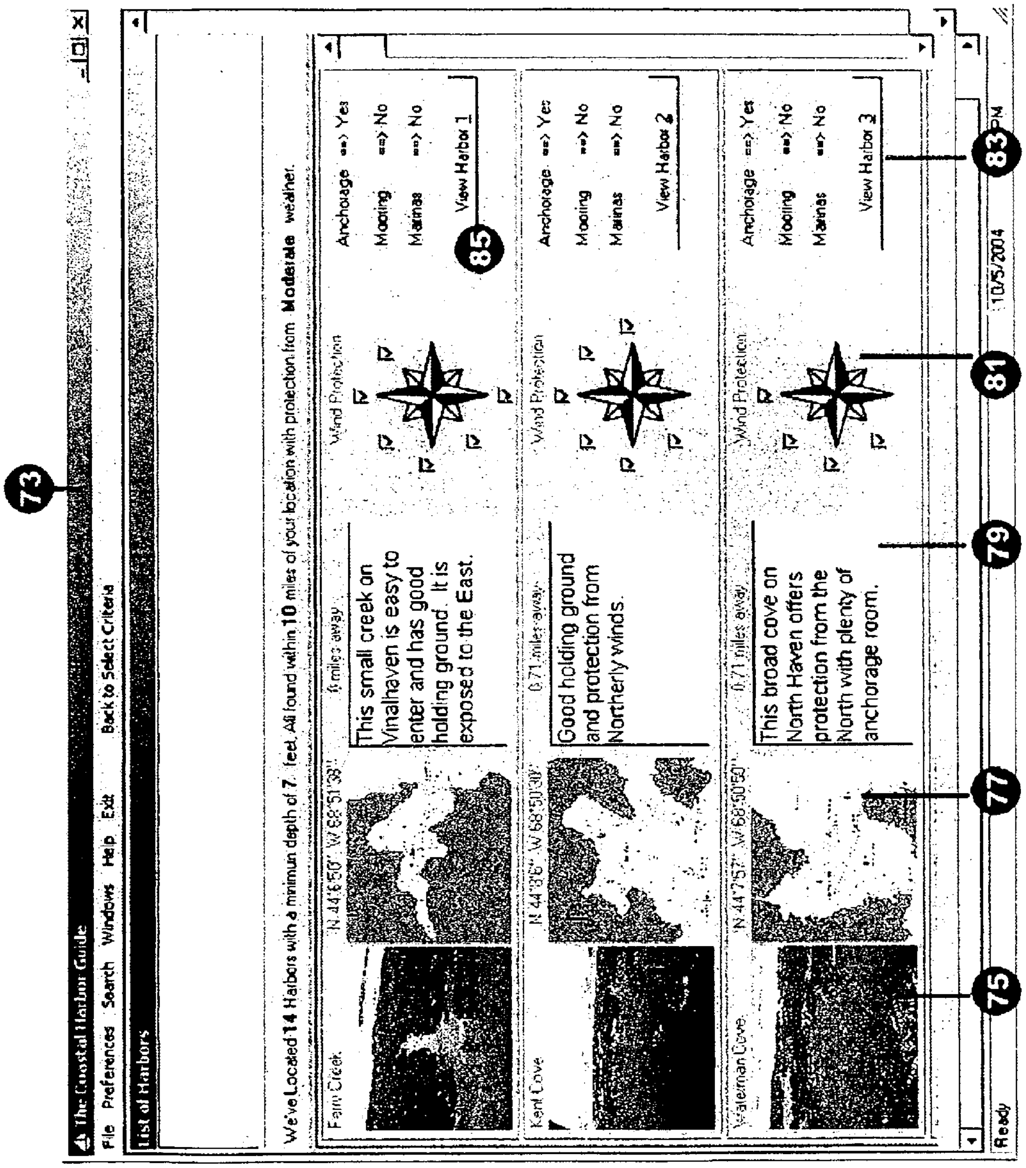
FIG. 5 is an image of a selected harbors list display.

FIG. 5 depicts the information provided for the selected harbors in a List of Safe Harbors window 73. The harbors are listed in order of closeness to the vessel location. Each harbor is depicted in five information fields. These fields are the following: An image field 75 contains an aerial photograph of the harbor, captioned with the harbor name. The map field 77 presents a chart showing the harbor details, captioned by the harbor Lat/Long coordinates. The description field 79 provides brief text comments on the characteristics of the harbor, captioned by the distance from the determined vessel location. The wind protection field 81 provides a compass rose indicating the directions with respect to which there is harbor wind protection. The facilities field provides textual confirmation of the availability of anchorage, moorage and marina facilities and a button 85 to provide access to more detailed harbor information along with photos, images enlarged harbor view.

Figure 6:
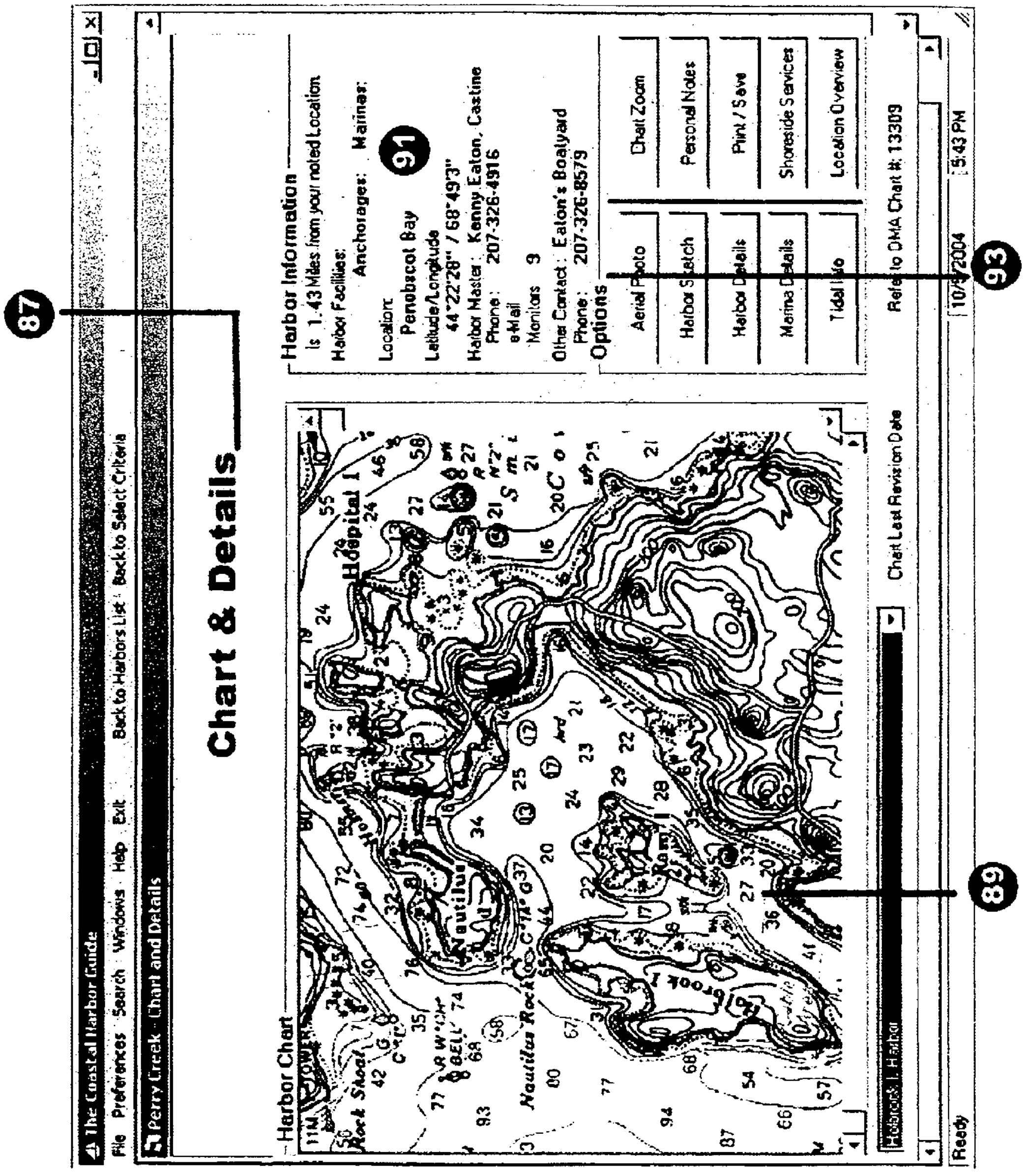
FIG. 6 is an image of a chart and details window for a particular harbor.

FIG. 6 depicts the enlarged chart and details window 87 for a particular harbor. This is reached by clicking the view harbor button 85 for the desired harbor. As seen in FIG. 6, window 87 provides a chart section 89, a summary information section 91, and an options section 93. The summary information section provides distance from the vessel location, the available facilities, accurate coordinates for the harbor, and contact information. The options section allows immediate access to an ariel photo, a harbor sketch, harbor details, marina details, tidal information shoreside (emergency) services, and other indicated features. On FIG. 6 the location overview opens a map centered on a harbor, with a dropdown menu permitting selection of a bird's eye view of 5 to 40 miles radius from the location point.

Figure 7:
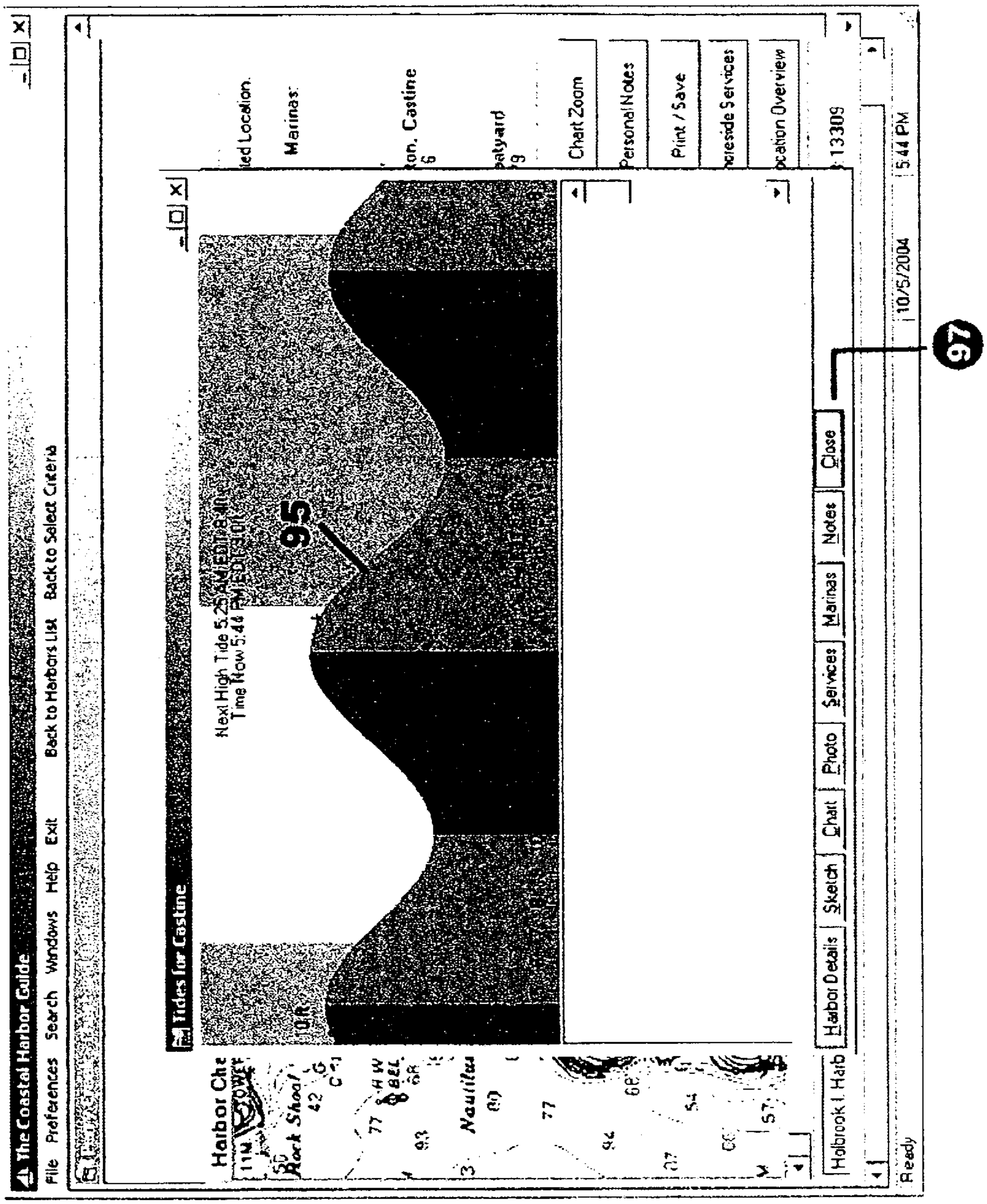
FIG. 7 is an image of a tidal information window.

FIG. 7 shows the tidal information obtained by activating the tidal information option. The tidal data for the station closest to the selected harbor is provided as text noting near future tides and a current real time tidal curve 95 depicting the height above mean low tide for the harbor. This is depicted as a pop up window, with buttons 97 allowing immediate access to other aspects of the program.

Figure 8:
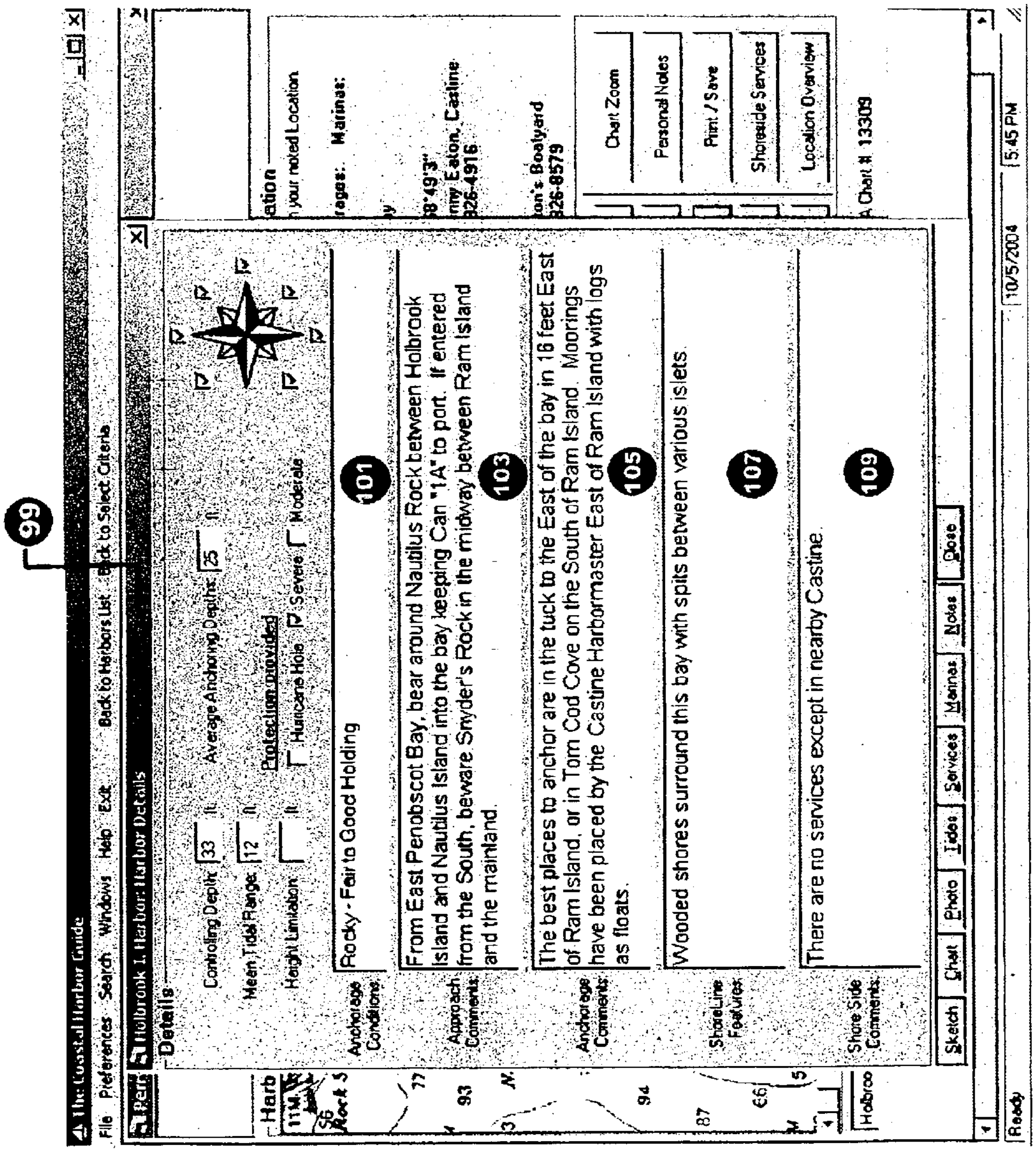
FIG. 8 is an image of a harbor details window.

FIG. 8 depicts a pop up harbor details window 99, which is obtained by activating the harbor details button in the options section 93. Window 99 provides an anchorage conditions section 101, an approach comments section 103, an anchorage comments section 105, a shoreline features section 107, and a shore side services section 109.

All of the information displayed by the harbor guide is contained in databases that are stored in the application. Based upon the values that are stored in the fields defined above, the data is filtered to select information corresponding to the field value. The filtered data is then displayed as has been described. It should be understood that filtering as described in this application refers to any method for selecting the data correspond to the values in the described fields. In particular, looking up corresponding data constitutes filtering as that term is defined in this document.

Figure 9A:
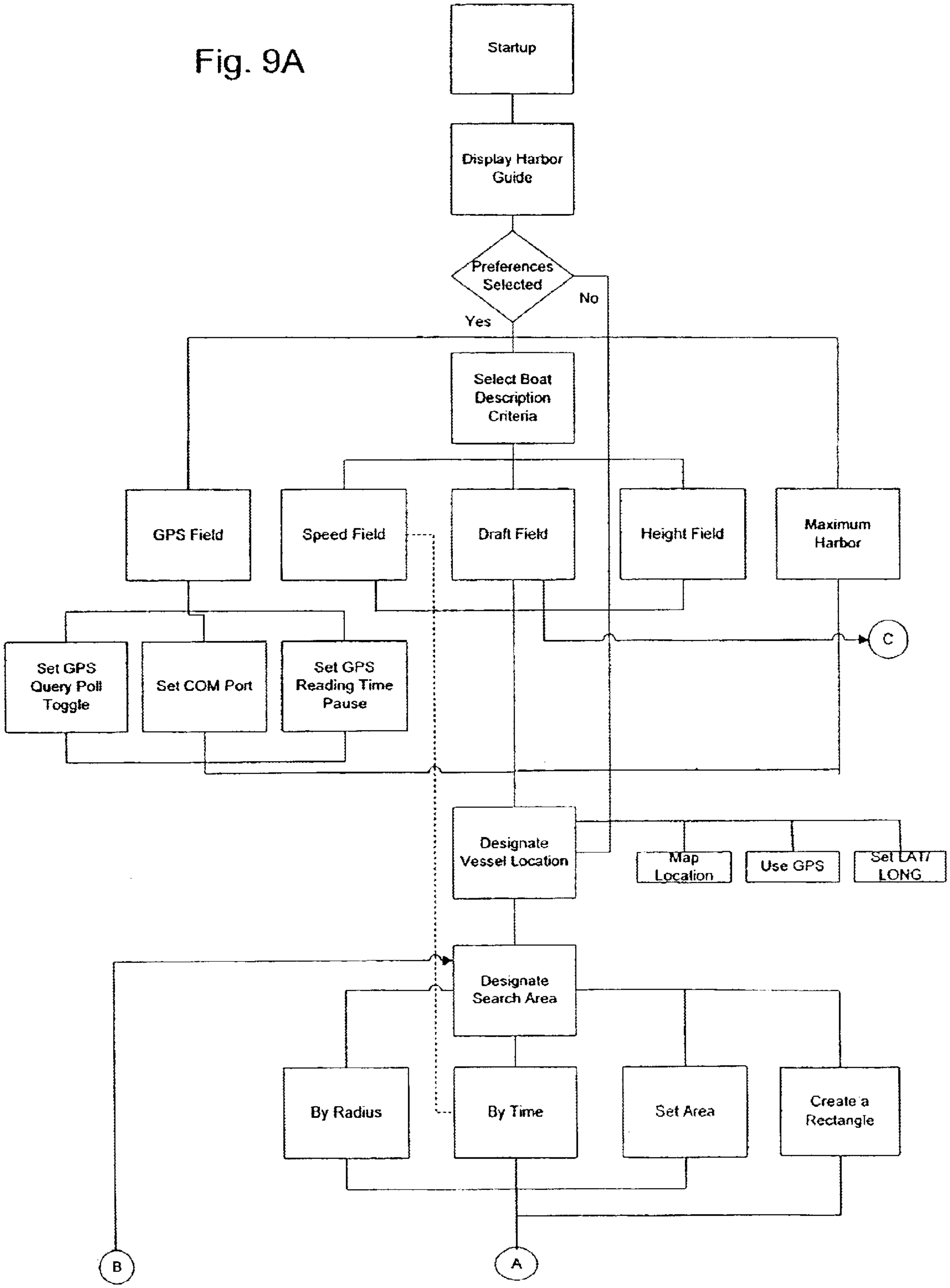
FIGS. 9A–9B is a logical diagram for the implementation of the different sages of the invention.
Figure 9B:
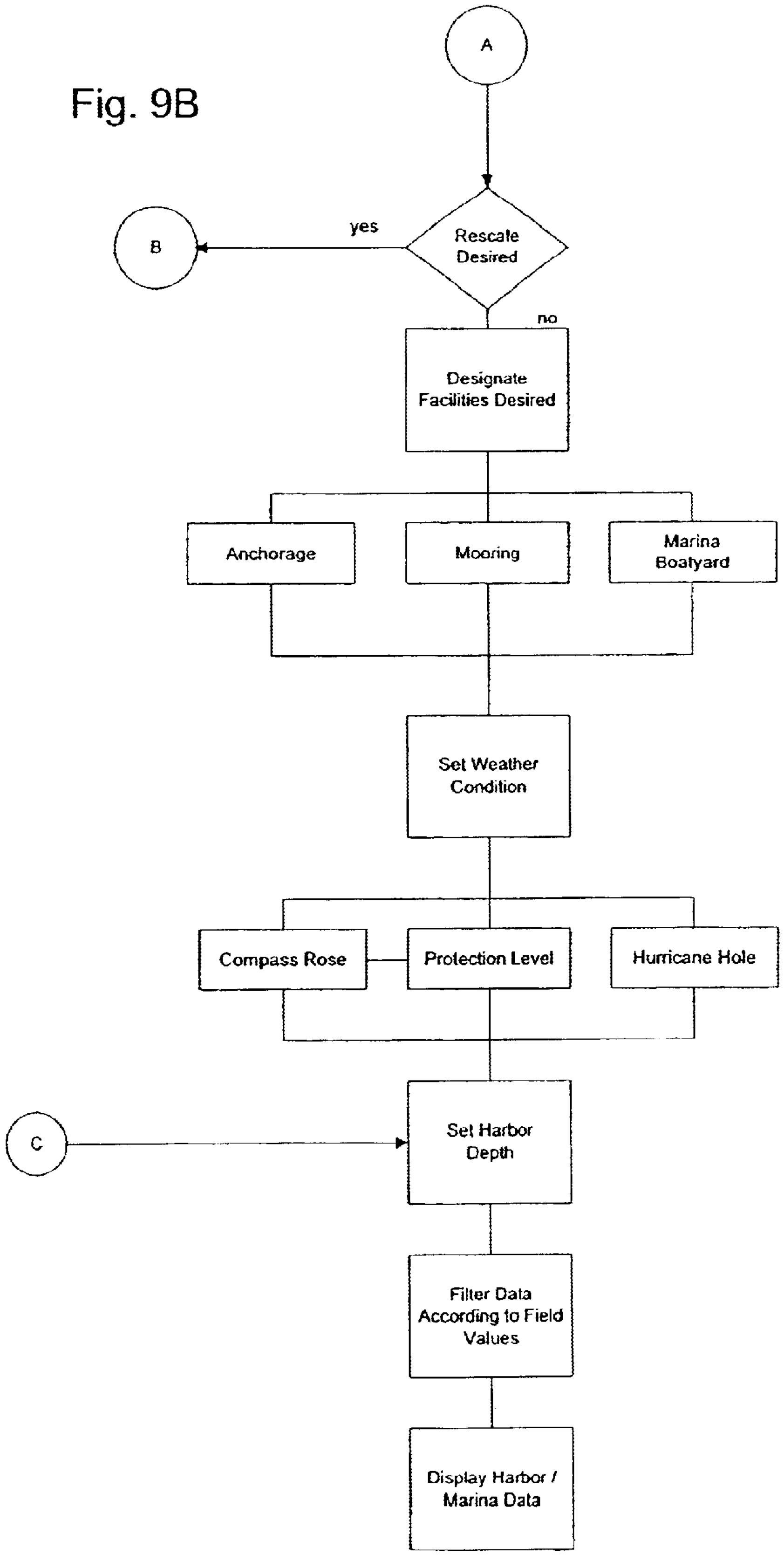

As shown in FIG. 9, comprising flow charts 9A and 9B, after startup the Harbor Guide is displayed together with a menu from which certain preferences may be selected. The preferences are related to the GPS, Boat Description and Harbor parameters. More than one may be selected. For the Boat Description, information may be input into fields for the boat speed, draft and height. The draft information may later be used to set the minimum harbor depth. The GPS parameters are a toggle for the GPS Query Poll, a COM port setting and the GPS reading time pause interval. Another preference is the maximum number of harbors to be considered, which will prevent the display from becoming swamped when there are many harbors in an area.

After the completion of preference selection, or if preference selection is skipped, the vessel location is designated by specifying either a map location, GPS data or by setting the latitude and longitude of the vessel location.

A search area is then selected by specifying a radius about the vessel or pointer location, by the time that the mariner wishes to take to get to the harbor or by setting an area. In the case of the time setting, the invention relies on the boat speed previously entered in order to calculate a radius. The images presented can then be rescaled by selecting zooming features to adjust the search area.

The mariner can then specify the facilities desired at the harbor such as anchorage, mooring and the availability of a marina boatyard.

The weather conditions from which shelter is desired are then input by indicating direction on a compass rose, specifying a protection level or requiring that the harbor be a "hurricane hole", i.e. safe from extreme conditions arising from any direction.

The user then sets the harbor depth and the data present in the system is then filtered according to the values that have been entered, following which the harbor and/or marina data is displayed for the user. Where the user has thus determined a rout to a particular harbor, that route information may also be saved so that the selection process does not have to be repeated for use on that route. In this way several routes may be stored in the system and compared without losing the data for one route while a second is considered.

Although particular embodiments of the invention have been described, it will be apparent to persons of ordinary skill in the relevant arts that the invention may be practiced by modifications that do not depart from the substance of the invention. Accordingly the scope of protection of this patent should not be limited to the disclosed embodiments but should be determined from the following description of the invention in terms of claims.

What is claimed is:

1. A microprocessor based system for selecting an appropriate harbor for a vessel subject to weather conditions comprising a. a program for receiving parameters descriptive of a vessel, the vessel's location, and weather conditions, b. a memory under the control of said program for receiving a database of harbor parameters c. a graphical interface under the control of said program for displaying maps of harbors corresponding to those whose harbor parameters are in the database and for allowing a user to input values of said parameters d. an algorithm for determining from the parameters a set of appropriate harbors.

2. The microprocessor based system for selecting an appropriate harbor for a vessel subject to weather conditions of claim 1, wherein said algorithm determines the set harbors by comparing a harbor depth and tidal parameters with the vessels depth below waterline parameter, and determining from the weather condition parameters those harbors that provide shelter from the particular weather conditions.

3. A method for selecting an appropriate harbor for a vessel subject to weather conditions comprising a. inputting into a computer interface the location of the vessel b. inputting into the computer interface one or more parameters of the weather condition c. inputting into the computer interface one or more parameters descriptive of the vessel d. selecting a geographic area into which to move the vessel e. inputting into a computer interface from the parameters of the weather conditions and the parameters descriptive of the vessel a set of appropriate harbors for the vessel f. plotting a course from the location of the vessel to the harbor and g. monitoring the course during the motion of the vessel to the harbor.

4. The method for selecting an appropriate harbor of claim 3 wherein the step of inputting into a computer interface the location of the vessel is accomplished by inputting latitude and longitude.

5. The method for selecting an appropriate harbor of claim 3 wherein the step of inputting into a computer interface the location of the vessel is accomplished by interfacing with a GPS device.

6. The method for selecting an appropriate harbor of claim 3 wherein the parameters of the weather condition comprise barometric readings.

7. The method for selecting an appropriate harbor of claim 3 wherein the parameters of the weather conditions include parameters forecasting the probable wind and tidal conditions over a period of time sufficient for the vessel to reach a set of harbors for the vessel and the step of inputting into a computer interface the set of appropriate harbors comprises selecting from those harbors within the reach of the vessel that satisfy predetermined appropriate criteria.

8. A software application for selecting an appropriate port for a vessel comprising a database of information concerning harbors in a geographic area, memory for retaining vessel parameters, fields to receive values indicative of a geographic area, said values being determined one or more of (a) range from a preselected point, (b) vessel speed and time to reach a harbor, (c) specific harbor names, (d) latitude and longitude, fields to receive values indicative of facilities at the harbor, fields to receive values indicative of wind direction from which protection is required, charts of harbors in the geographic area, data specifying facilities in the said harbors, a filter permitting selection by one or more field values.

9. The software application for selecting an appropriate port for a vessel of claim 8 wherein said vessel parameters include vessel speed, draft and vessel height.

10. The software application for selecting an appropriate port for a vessel of claim 8 wherein said preselected point may be obtained from a GPS device communicating with said software application.

11. The software application for selecting an appropriate port for a vessel of claim 8 further comprising fields to receive values indicative of various predefined (moderate or severe) wind conditions.

12. The software application for selecting an appropriate port for a vessel of claim 8 wherein said fields to receive values indicative of wind direction comprise a graphic display of a compass rose.

13. The software application for selecting an appropriate port for a vessel of claim 12, wherein said rose comprises at least eight compass points.

14. The software application for selecting an appropriate port for a vessel of claim 8 wherein said fields to receive values indicative of wind direction comprise fields for two to six compass point directions.

15. The software application for selecting an appropriate port for a vessel of claim 8 wherein said fields to receive values have default values.

16. The software application for selecting an appropriate port for a vessel of claim 15 wherein said default values specify a hurricane hole having restricted open water, protection from all wind directions, and holding ground at least as secure as heavy mud.

17. The software application for selecting an appropriate port for a vessel of claim 8 wherein said filter selects values of harbor depth.

18. The software application for selecting an appropriate port for a vessel of claim 17 wherein said harbor depth takes into account tide and surge effects.

19. The software application for selecting an appropriate port for a vessel of claim 8 wherein said filter selects anchorages and or moorings.

20. The software application for selecting an appropriate port for a vessel of claim 8 wherein said filter selects marina or boatyard availability.

* * * * *